(12) United States Patent
Havemann

(10) Patent No.: US 11,897,390 B2
(45) Date of Patent: Feb. 13, 2024

(54) TECHNIQUES FOR CONSTRUCTING AND CONTROLLING A VEHICLE LIGHT ASSEMBLY

(71) Applicant: HARMAN INTERNATIONAL INDUSTRIES, INCORPORATED, Stamford, CT (US)

(72) Inventor: Marcel Pilgaard Havemann, Hjerm (DK)

(73) Assignee: Harman International Industries, Incorporated, Stamford, CT (US)

( * ) Notice: Subject to any disclaimer, the term of this patent is extended or adjusted under 35 U.S.C. 154(b) by 540 days.

(21) Appl. No.: 16/698,828

(22) Filed: Nov. 27, 2019

(65) Prior Publication Data
US 2021/0155155 A1 May 27, 2021

(51) Int. Cl.
*B60Q 3/54* (2017.01)
*B60Q 3/16* (2017.01)
*F21V 19/00* (2006.01)
*F21V 23/00* (2015.01)
*F21Y 115/10* (2016.01)

(52) U.S. Cl.
CPC ............. *B60Q 3/54* (2017.02); *B60Q 3/16* (2017.02); *F21V 19/005* (2013.01); *F21V 23/005* (2013.01); *F21Y 2115/10* (2016.08)

(58) Field of Classification Search
CPC .......... B60Q 3/16; B60Q 3/70; F21V 19/005; F21V 23/005; F21Y 2115/10
USPC ....................................................... 362/543
See application file for complete search history.

(56) References Cited

U.S. PATENT DOCUMENTS

| | | |
|---|---|---|
| 2013/0026504 A1 | 1/2013 | Marx et al. |
| 2016/0154170 A1 | 6/2016 | Thompson et al. |
| 2018/0086255 A1 | 3/2018 | Salter et al. |
| 2018/0144882 A1* | 5/2018 | Wang ................ H01H 13/50 |

(Continued)

FOREIGN PATENT DOCUMENTS

| | | |
|---|---|---|
| CA | 2898309 A1 | 3/2016 |
| CN | 103423666 A | 12/2013 |

(Continued)

OTHER PUBLICATIONS

Extended European Search Report for application No. 20210366.9 dated Mar. 26, 2021.

*Primary Examiner* — Andrew J Coughlin
*Assistant Examiner* — Hana S Featherly
(74) *Attorney, Agent, or Firm* — Artegis Law Group, LLP

(57) ABSTRACT

Constructing and controlling light assemblies in a vehicle interior. A light assembly is constructed by forming a PCB layer to have a shape that is based on a shape of a corresponding vehicle component. A set of light sources are mounted onto the PCB layer and the PCB layer is attached to the corresponding vehicle component. The light assembly is connected to a light controller that supplies power and control signals to the light sources. A lighting effects engine receives an input from a user or a vehicle sub-system, determines a lighting effect corresponding to the received input, retrieves a set of lighting routines associated with the lighting effect, and transmits the set of lighting routines to a set of light controllers. The set of light controllers collectively generate the lighting effect by applying/executing the received lighting routines on the set of light assemblies.

20 Claims, 9 Drawing Sheets

(56) References Cited

U.S. PATENT DOCUMENTS

2019/0006872 A1   1/2019  Ali et al.
2019/0016254 A1*  1/2019  Salter .................... B60R 1/1207

FOREIGN PATENT DOCUMENTS

EP       2 215 298 A1   8/2010
WO      2009/066228 A1   5/2009

* cited by examiner

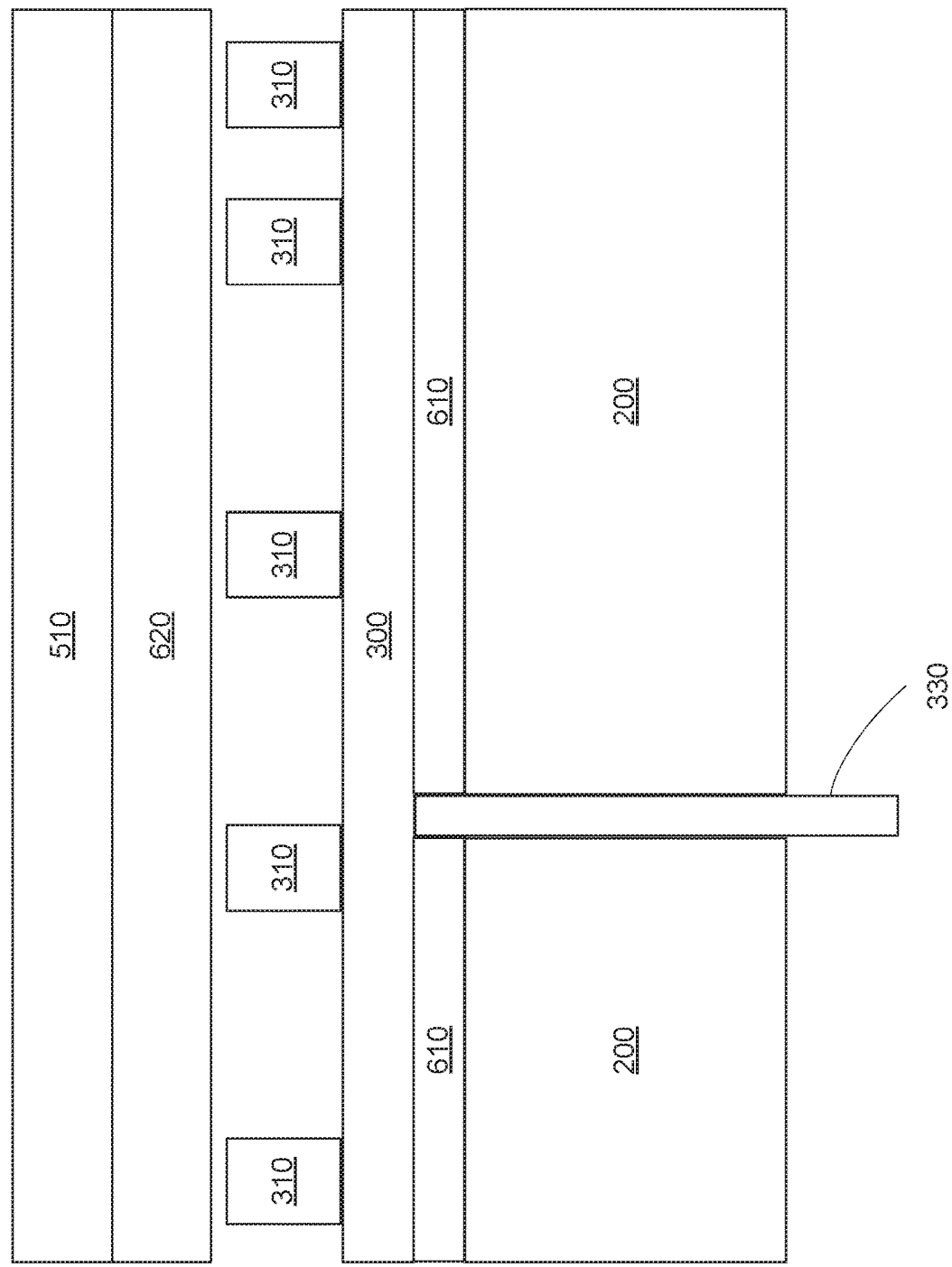

| | | 950a | 950b | 950c | 950d | 950e |
|---|---|---|---|---|---|---|
| 901a → | UI_a | LightingEffect_UI_a: | LR_3; LR_3; LR_8; LR_2; LR_2 | | | |
| 901b → | UI_b | LightingEffect_UI_b: | LR_11; LR_11; LR_11; LR_11; LR_11 | | | |
| 901c → | UI_c | LightingEffect_UI_c: | LR_0; LR_0; LR_0; LR_0; LR_0 | | | |
| | ... | ... | ... | | | |
| | Navi_a | LightingEffect_Navi_a: | LR_3; LR_0; LR_0; LR_0; LR_0 | | | |
| | Navi_b | LightingEffect_Navi_b: | LR_0; LR_3; LR_0; LR_0; LR_0 | | | |
| | Navi_c | LightingEffect_Navi_c: | LR_12; LR_12; LR_12; LR_12; LR_12 | | | |
| | ... | ... | ... | | | |
| | SA_a | LightingEffect_SA_a: | LR_8; LR_0; LR_0; LR_0; LR_0 | | | |
| | SA_b | LightingEffect_SA_b: | LR_0; LR_8; LR_0; LR_0; LR_0 | | | |
| | SA_c | LightingEffect_SA_c: | LR_8; LR_8; LR_8; LR_0; LR_0 | | | |
| | ... | ... | ... | | | |
| | Fund_a | LightingEffect_Fund_a: | LR_13; LR_0; LR_0; LR_0; LR_0 | | | |
| | Fund_b | LightingEffect_Fund_b: | LR_0; LR_13; LR_0; LR_0; LR_0 | | | |
| | Fund_c | LightingEffect_Fund_c: | LR_12; LR_12; LR_12; LR_0; LR_0 | | | |
| | ... | ... | ... | | | |
| | ENT_a | LightingEffect_ENT_a: | LR_0; LR_0; LR_15; LR_0; LR_0 | | | |
| | ENT_b | LightingEffect_ENT_b: | LR_0; LR_0; LR_16; LR_0; LR_0 | | | |
| | ENT_c | LightingEffect_ENT_c: | LR_19; LR_19; LR_19; LR_19; LR_19 | | | |
| | ... | ... | ... | | | |

TECHNIQUES FOR CONSTRUCTING AND CONTROLLING A VEHICLE LIGHT ASSEMBLY

BACKGROUND

Field of the Embodiments

The present disclosure relates generally to vehicle lighting systems and, more specifically, to constructing and controlling a vehicle light assembly.

Description of the Related Art

For vehicle manufacturers, enhancing the occupant experience by improving visual aesthetics within the interior of the vehicle is generally desirable and oftentimes the focus of vehicle interior designs. One technique for improving visual aesthetics within the vehicle interior is to provide aesthetic lighting at various locations within the vehicle. A current approach for providing such lighting within a vehicle interior involves implementing light sources that are connected to various light guides that are, in turn, routed throughout the vehicle interior to provide lighting at desired locations within the vehicle. However, this current approach is not terribly robust, is too complex, requires too much space, and is expensive. In particular, light guides (such as fiber optics) are typically quite fragile, and routing these light guides to the desired locations within the vehicle without interference from other vehicle components is typically a complex undertaking and requires substantial space within the vehicle interior.

As the foregoing illustrates, what is needed in the art are more effective techniques for providing aesthetic lighting to locations within a vehicle interior.

SUMMARY

Various embodiments include a vehicle lighting system comprising a light assembly. The light assembly has a printed circuit board (PCB) layer that is attachable to a vehicle component, wherein a shape of the PCB layer is based on a shape of the vehicle component. The light assembly further has a set of light sources mounted on the PCB layer. The vehicle lighting system further comprises a light controller that is coupled to the light assembly and, when in operation, causes the set of light sources to generate a lighting effect within an interior of a vehicle.

At least one technical advantage of the disclosed techniques relative to the prior art is that the disclosed techniques enable varying lighting effects within the interior of a vehicle via a simple and robust light assembly. In that regard, the light assembly is constructed by forming a printed circuit board (PCB) layer in the shape of a vehicle component, mounting light sources on the PCB layer, and attaching the PCB layer with the mounted light sources onto the vehicle component. The light assembly is connected to a light controller that controls the mounted light sources. The light controller receives lighting routines from a lighting effects engine and controls the light sources of the light assembly to generate the desired lighting effects. In this manner, lighting effects within the interior of a vehicle are provided via a relatively simple, compact, and robust light assembly. These technical advantages represent one or more technological advancements over prior art approaches.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 6 is a block diagram of an exemplary light assembly that can be implemented in the vehicle lighting system of FIG. 1, according to various embodiments;

FIG. 9 is a conceptual diagram of the lighting mapping table of FIG. 8, according to various embodiments.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

The embodiments are described in part below with reference to flowchart illustrations and/or block diagrams of methods, systems, and computer program products and data structures according to embodiments herein. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

Vehicle Lighting System

Figure 1:
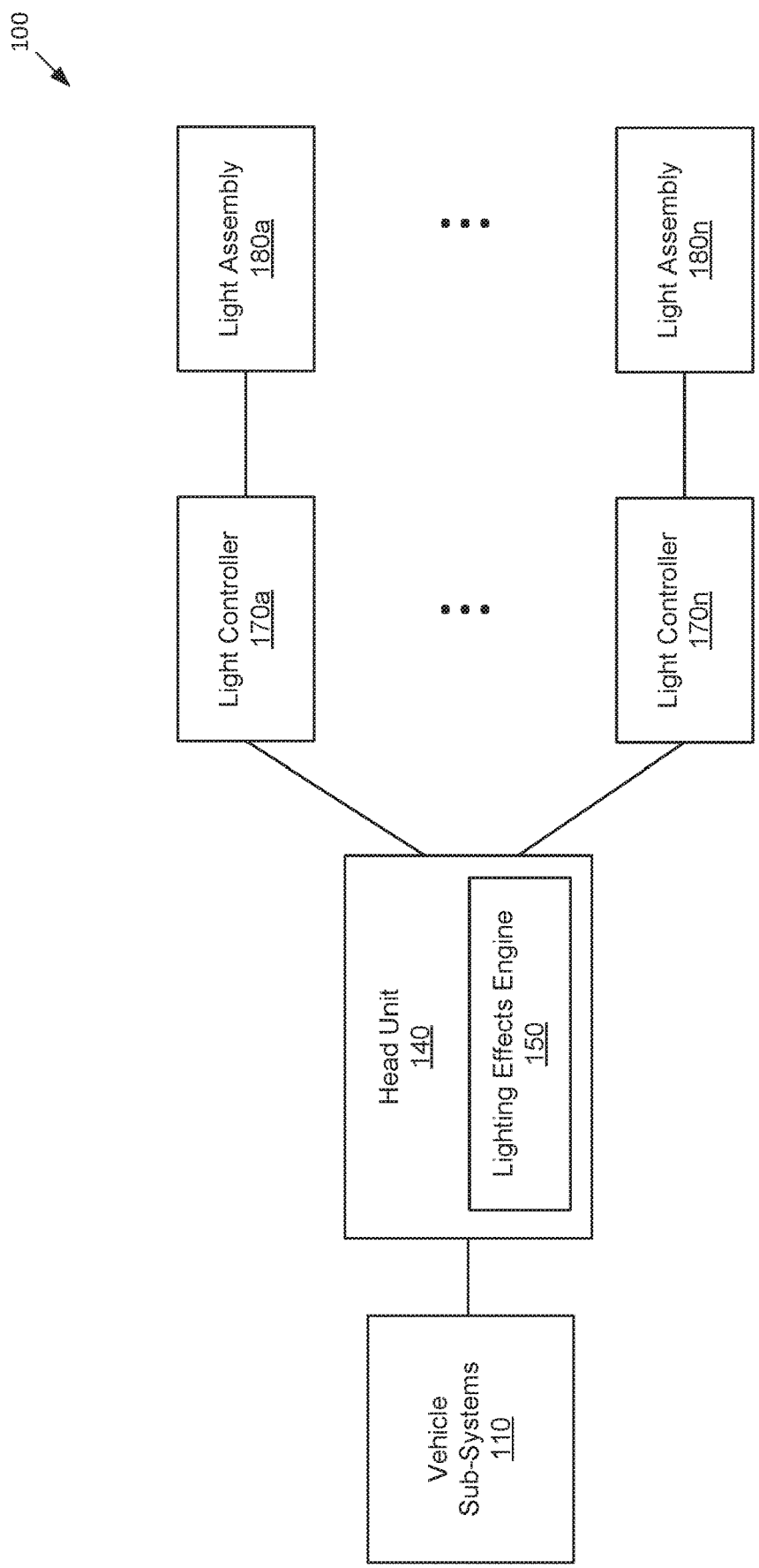
FIG. 1 is a block diagram of a vehicle lighting system configured to implement one or more aspects of the various embodiments.

FIG. 1 is a block diagram of a vehicle lighting system 100 configured to implement one or more aspects of the various embodiments. The vehicle lighting system 100 includes vehicle sub-systems 110, a head unit 140, a set of light controllers 170, and a set of light assemblies 180 interconnected via a bus, network, or any other feasible electrical connections. The vehicle sub-systems 110, head unit 140, set of light controllers 170, and set of light assemblies 180 are each installed in a vehicle.

Each light controller 170 is connected with and controls a corresponding light assembly 180. Each light controller 170 also includes a power supply (not shown) that provides power to the light controller 170 and the corresponding light assembly 180. In some embodiments, the light controller 170 receives a lighting routine (corresponding to a particular lighting effect) and sends control signals to the light assembly 180 for controlling light sources of the light assembly 180 in accordance with the received lighting routine (thereby producing the corresponding lighting effect). The light controller 170 may include a memory for storing instructions and a processor for executing the instructions for controlling the light assembly 180 based on a received lighting routine. In general, a light controller 170 comprises any type of device suitable for controlling the light sources of the light assembly 180 to provide different colors, intensities (brightness levels), and/or lighting patterns for generating various lighting effects. For example, the light controller 170 may comprise a microcontroller, application-specific integrated circuit (ASIC), a field programmable gate array (FPGA), programmable logic controller (PLC), or other programmable logic device.

The head unit 140 includes a lighting effects engine 150 that provides lighting effects to the interior of the vehicle via the set of one or more light controllers 170 (such as 170a-170n) and the set of light assemblies 180 (such as 180a-180n). In these embodiments, the logic of the lighting effects engine is located in the head unit 140. In other embodiments, the logic of the lighting effects engine is external to the head unit 140, for example, in a separate hardware unit. Each light assembly 180 includes a PCB layer that is formed to have a shape corresponding to a particular interior component of a vehicle (such as a speaker cover or mirrorsail). The PCB layer is attachable to the corresponding vehicle component. Each light assembly 180 is positioned within the interior of the vehicle at the location of the corresponding interior vehicle component. For example, a first light assembly 180a is formed to resemble the shape of a left-front speaker cover, and a second light assembly 180b is formed to resemble the shape of a right-front speaker cover. Therefore, the first light assembly 180a is placed at the location of the left-front speaker cover, and the second light assembly 180b is placed at the location of the right-front speaker cover. Each light assembly 180 includes light sources, such as light-emitting diodes (LEDs), mounted to the PCB layer. Each light assembly 180 further includes a light controller 170 connected to the PCB layer for controlling the light sources.

The lighting effects engine 150 receives inputs from a user and/or vehicle sub-systems 110 and outputs a lighting effect/lighting pattern corresponding to the received input. For example, the lighting effects engine 150 may receive a particular user input, map the user input to a particular lighting effect, and retrieve a set of lighting routines that generate the lighting effect. Each lighting routine in the set of lighting routines is associated with a particular light controller 170 and light assembly 180 pair. The lighting effects engine 150 then transmits the set of lighting routines to the set of light controllers 170. The set of light controllers 170 collectively generate the selected lighting effect/lighting pattern by executing the received lighting routines on the set of light assemblies 180.

In other embodiments, the lighting effects engine 150 receives a particular input signal from a vehicle sub-system 110 and maps the received input signal to a particular lighting effect. For example, lighting effects engine 150 may receive an input signal comprising a "turn left" navigation direction from a navigation/GPS sub-system, and map the input signal to a "turn left" lighting effect that includes activating blue blinking lights located at a left-front position within the vehicle. The lighting effects engine 150 retrieves a set of lighting routines that generate the "turn left" lighting effect and transmits the set of lighting routines to the set of light controllers 170.

Techniques for constructing the light assembly 180 are discussed in further detail in relation to FIG. 2-7. Techniques for controlling the light assembly 180 via the lighting effects engine 150 are discussed in further detail in relation to FIG. 8-10.

Techniques for Constructing the Light Assembly

Figure 2:
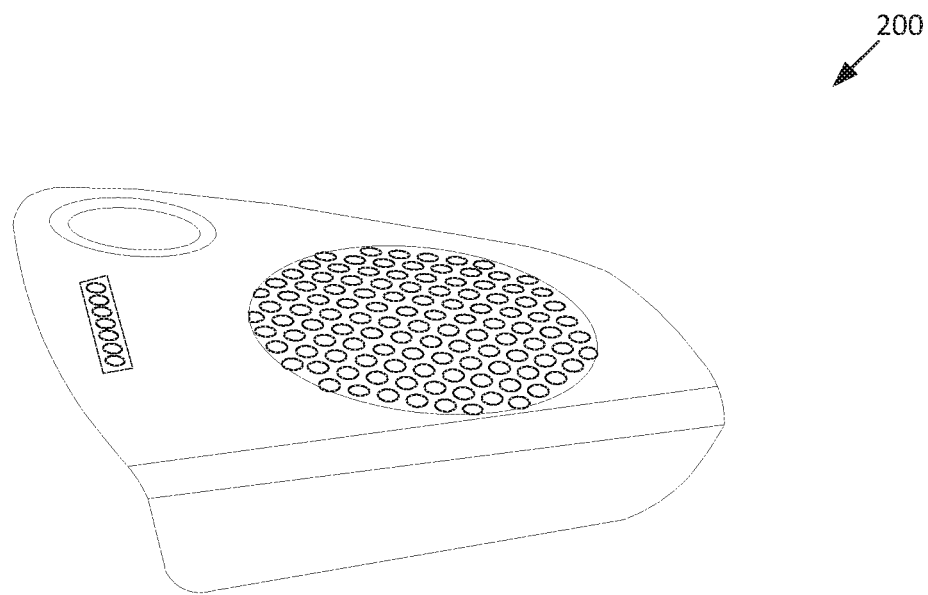
FIG. 2 illustrates an exemplary vehicle component that can be implemented in the vehicle lighting system of FIG. 1, according to various embodiments.

FIG. 2 illustrates an exemplary vehicle component 200 that can be implemented in the vehicle lighting system of FIG. 1, according to various embodiments. In the example of FIG. 2, the vehicle component 200 comprises a speaker cover for an audio speaker positioned in any location within the vehicle. Other examples of the vehicle component 200 include a mirrorsail (interior portion of a side mirror), a door panel, a dashboard panel, a ceiling panel, a pillar panel, and the like. In other embodiments, the vehicle component 200 may comprise any other type of interior component of a vehicle. A light assembly 180 is formed on top of a particular vehicle component 200, and thus is positioned within the interior of the vehicle at the location of the particular vehicle component 200. Therefore, the set of light assemblies 180 may be located at any of various locations within the interior of the vehicle, such as the speakers, mirrorsails, doors, dashboard, ceiling, pillars, and the like.

Figure 3:
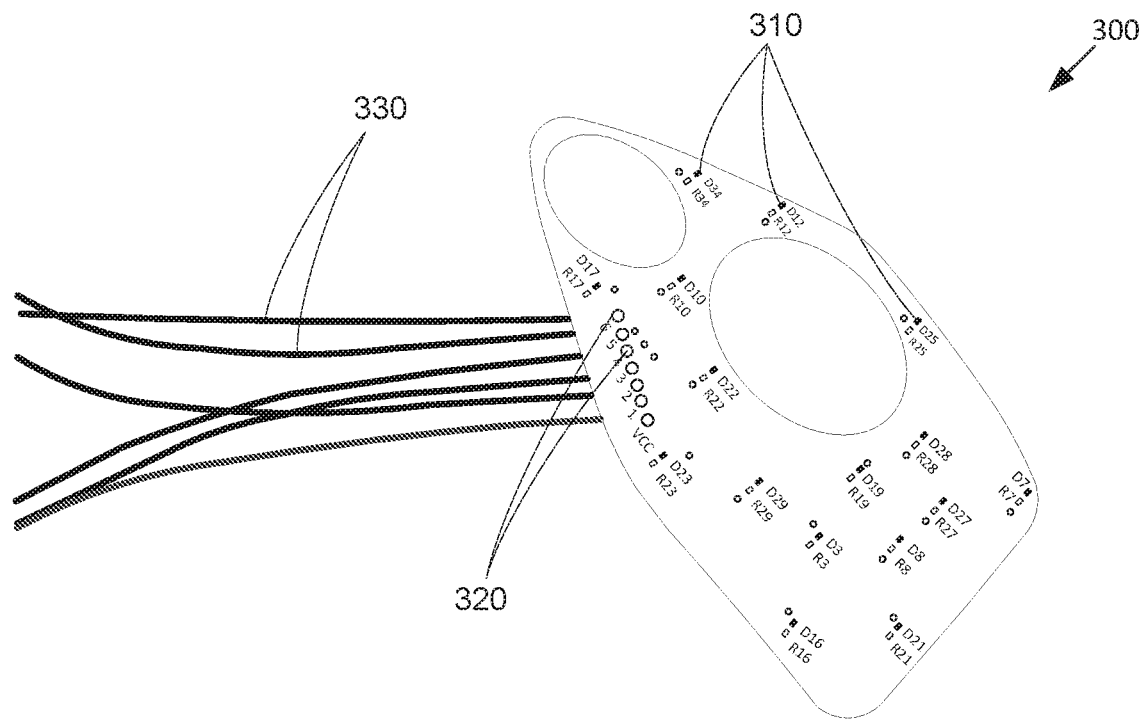
FIG. 3 illustrates an exemplary PCB layer constructed for the vehicle component of FIG. 2, according to various embodiments.

FIG. 3 illustrates an exemplary PCB layer 300 constructed for the vehicle component 200 of FIG. 2, according to various embodiments. As shown, the PCB layer 300 is constructed/formed to have a geometric shape that is based on a geometric shape of the corresponding vehicle component 200. In some embodiments, the PCB layer 300 is constructed/formed to have a geometric shape that approximates, resembles, and/or is substantially similar to a geometric shape of the corresponding vehicle component 200. The PCB layer 300 is attachable to the corresponding vehicle component 200. In the example of FIG. 3, the PCB layer 300 is constructed to have a pair of holes corresponding in size and location as the pair of holes in the corresponding vehicle component 200. The PCB layer 300 can be further perforated with smaller holes to allow sound from the speaker to penetrate through the PCB layer 300. In other embodiments, the PCB layer 300 comprises multiple PCBs connected to each other to form desired shapes, such as a double curvature.

In some embodiments, the PCB layer 300 comprises any form of printed circuit, such as a rigid printed circuit board or a flexible printed circuit ("flex circuit"). A rigid printed circuit board may be formed from material such as fiberglass-filled epoxy, or other suitable material. A flexible printed circuit may be formed, for example, from one or more flexible sheets of polymer, such as polyimide, or other suitable material. In further embodiments, the PCB layer 300 may be formed from a combination of rigid and flexible layers ("rigid-flex" printed circuit). In other embodiments, the PCB layer 300 may comprise any type of substrate suitable for mounting light sources and forming electrical connections for the light sources.

As shown, the PCB layer 300 is further constructed/formed by mounting a set of light sources 310 onto the PCB layer 300 and forming a set of terminals 320 on the PCB layer 300. The PCB layer 300 is further constructed by forming internal wiring/traces (not shown) that connects the terminals 320 to the light sources 310 for powering and sending control signals to the set of light sources 310. The set of terminals 320 connects the PCB layer 300 to external wiring 330. The external wiring 330 connects the set of terminals 320 to a corresponding light controller 170 (not shown) to supply power and control signals to the set of light sources 310. As formed with the light sources 310, internal wiring/traces, and terminals 320, the PCB layer 300 may be referred to as a PCB Assembly (PCBA) that is populated with interconnected electronic components.

In some embodiments, the light sources 310 comprise light-emitting diodes (LEDs). In these embodiments, any type of LED may be used, such as individual red, green and blue LEDs, white LEDs, high-power LEDs (HP-LEDs), high-output LEDs, bi-color LEDs, tri-color LEDs, and the like. In general, any set of LEDs for providing different colors, intensities (brightness levels), and lighting patterns to generate desired lighting effects may be implemented herein. Each LED may be connected to a separate trace so that each LED can be controlled independently.

Figure 4:
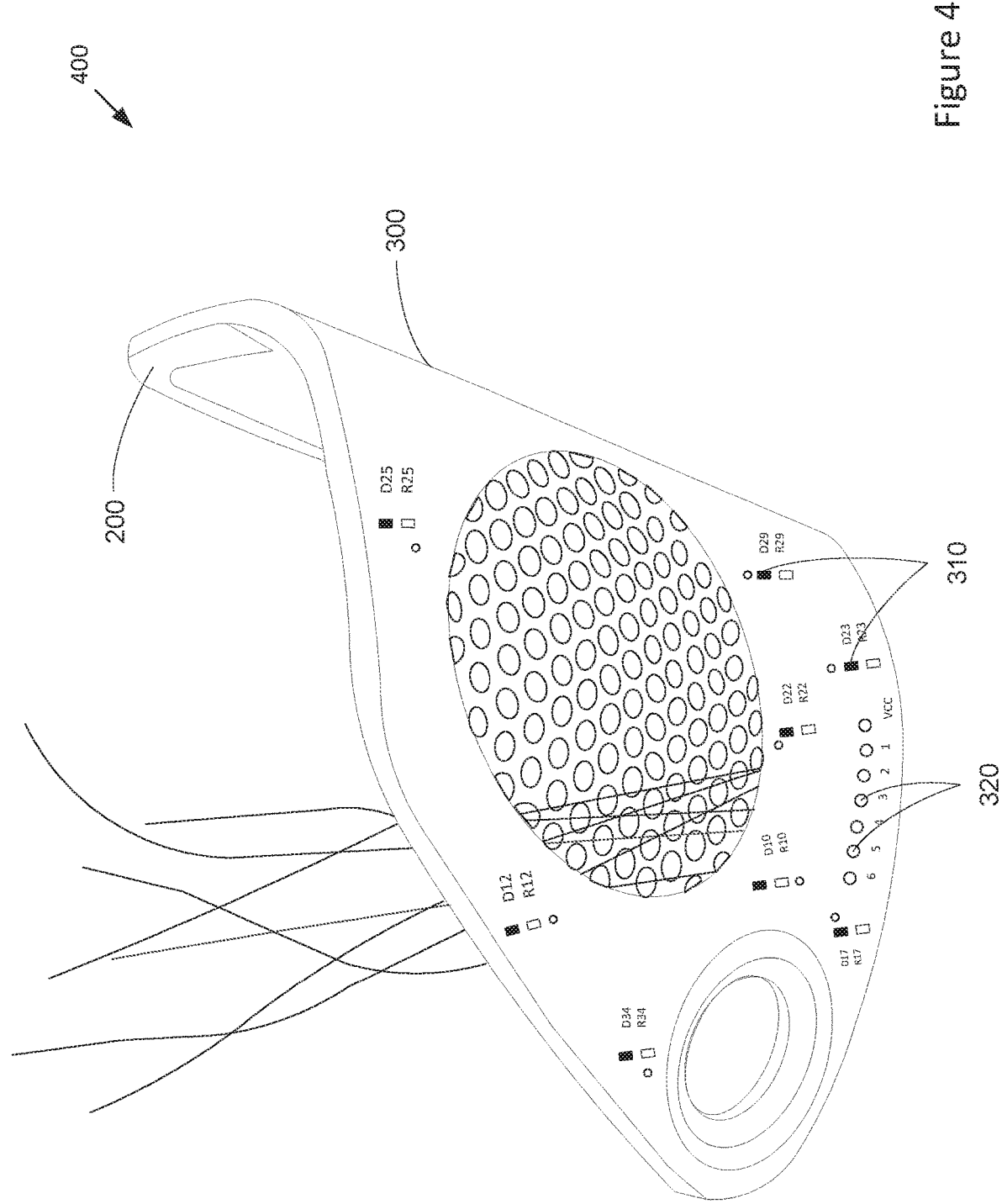
FIG. 4 illustrates an exemplary light assembly that can be implemented in the vehicle lighting system of FIG. 1, according to various embodiments.

FIG. 4 illustrates an exemplary light assembly 400 that can be implemented in the vehicle lighting system of FIG. 1, according to various embodiments. As shown, the light assembly 400 comprises a formed PCB layer 300 (having mounted light sources 310) that is fixed/attached to a corresponding vehicle component 200. In some embodiments, the PCB layer 300 is fixed/attached to the corresponding vehicle component 200, for example, via an adhesive layer (not shown) placed between the PCB layer 300 and the vehicle component 200. In other embodiments, the PCB layer 300 is fixed/attached to the corresponding vehicle component 200 via other feasible techniques, such as via mechanical-based connectors and fasteners. Since the PCB layer 300 is formed to have a geometric shape resembling the geometric shape of the corresponding vehicle component 200, the PCB layer 300 easily attaches to the corresponding vehicle component 200 with no portions of the PCB layer 300 protruding beyond the physical boundaries of the corresponding vehicle component 200.

Figure 5A:
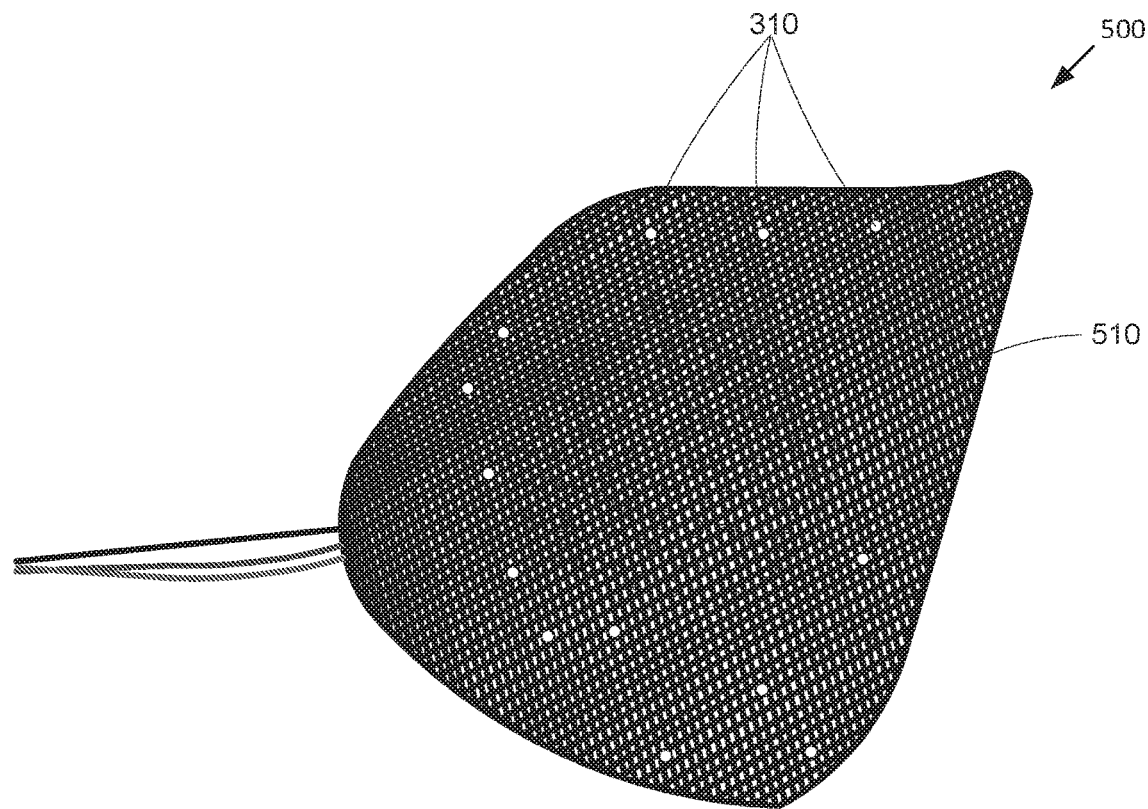
FIG. 5A illustrates an activated light assembly that can be implemented in the vehicle lighting system of FIG. 1, according to various embodiments.

FIG. 5A illustrates an activated light assembly 500 that can be implemented in the vehicle lighting system of FIG. 1, according to various embodiments. In the example of FIG. 5A, the light assembly 500 includes the light assembly 400 of FIG. 4 and further includes a fabric layer 510. In these embodiments, the fabric layer 510 covers the PCB layer 300 and mounted light sources 310. The fabric layer 510 comprises any suitable fabric that allows the light from the light sources 310 to be seen/visible through the fabric. For example, the fabric layer 510 may comprise synthetic fibers (such as polyester), natural fibers (such as cotton), or a combination thereof (such as cotton-polyester blends). In other embodiments, the fabric layer 510 comprises any type of fabric with a weaving that allows light to penetrate and be visible through the fabric. In the example of FIG. 5A, the light sources 310 are activated/turned on, whereby the resulting lighting effect can be seen through the fabric layer 510. In the example of FIG. 5A, the light assembly 500 is generating the "starry night" lighting effect.

Figure 5B:
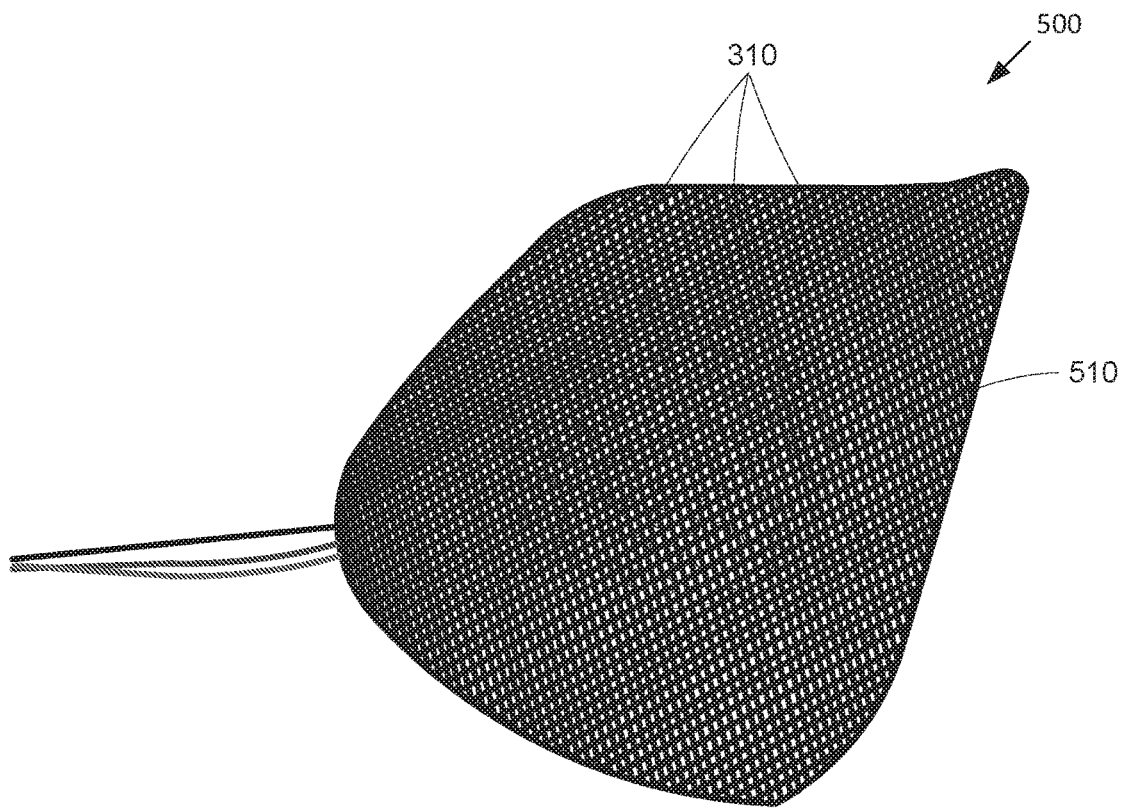
FIG. 5B illustrates a non-activated light assembly that can be implemented in the vehicle lighting system of FIG. 1, according to various embodiments.

FIG. 5B illustrates a non-activated light assembly 500 that can be implemented in the vehicle lighting system of FIG. 1, according to various embodiments. In the example of FIG. 5B, the light assembly 500 includes the light assembly 500 of FIG. 5A, whereby the light sources 310 are de-activated/turned off. As shown, when the light sources 310 are de-activated, the light sources 310 and the PCB layer 300 are not visible through the fabric layer 510. In this manner, when the light sources 310 are de-activated/turned off, the light assembly 500 has the typical appearance of the corresponding vehicle component 200.

FIG. 6 is a block diagram of an exemplary light assembly 600 that can be implemented in the vehicle lighting system of FIG. 1, according to various embodiments. As shown, the light assembly 600 comprises external wiring 330, an adhesive layer 610, a PCB layer 300 with mounted light sources 310, a protective layer 620, and a fabric layer 510. The adhesive layer 610 attaches/fixes the PCB layer 300 to a corresponding vehicle component 200. The external wiring 330 may be configured to pass through the vehicle component 200 and the adhesive layer 610 to connect the PCB layer 300 to a corresponding light controller 170 (not shown). In some embodiments, the adhesive layer 610 comprises a double-sided adhesive layer, glue, or any other suitable type of adhesive. The protective layer 620 may comprise a protective cover that protects the PCB layer 300 and light sources 310. In some embodiments, the protective layer 620 comprises a plastic cover, a silicone cover, or other suitable cover that is protective and see-through. In some embodiments, the protective layer 620 is molded onto the surface of the PCB layer 300.

Figure 7:
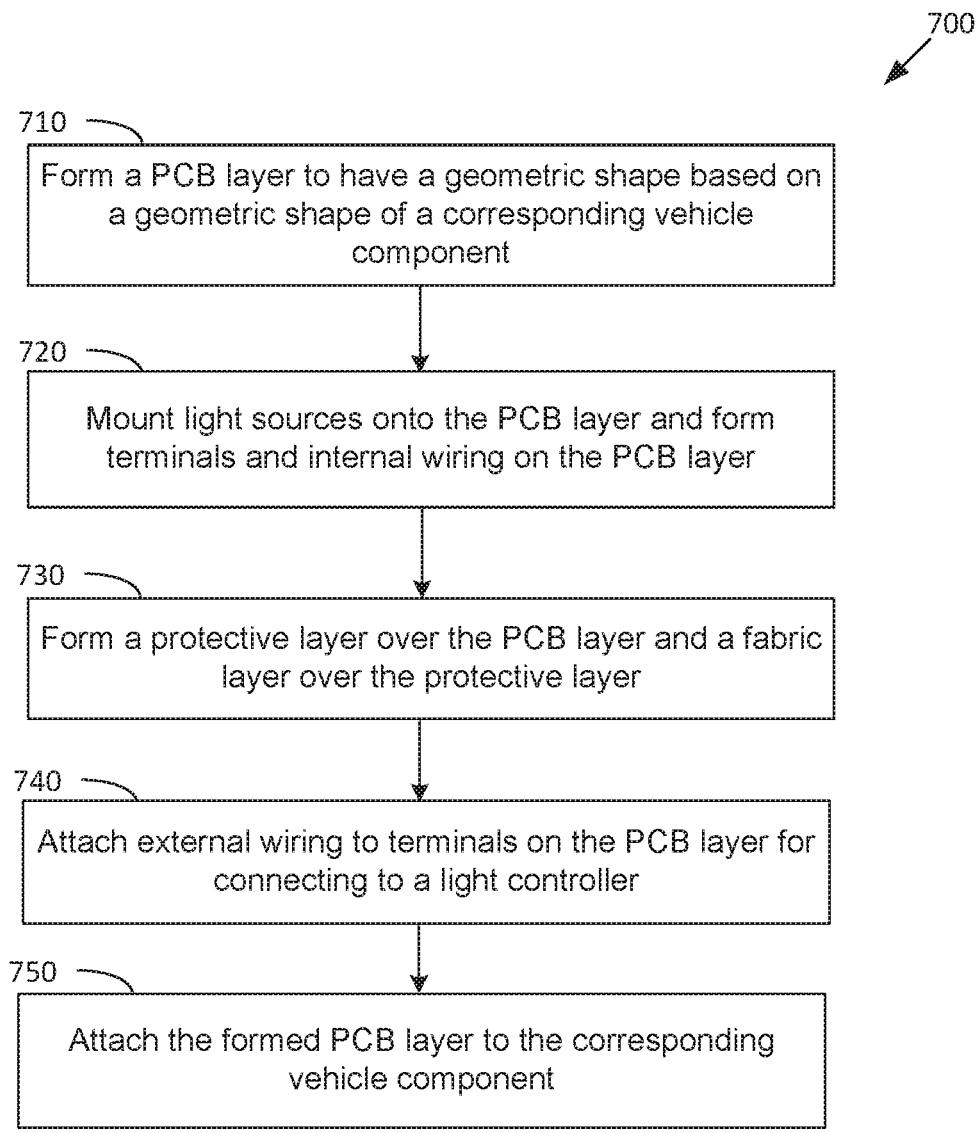
FIG. 7 is a flow diagram of method steps for constructing a light assembly that can be implemented in the vehicle lighting system of FIG. 1, according to various embodiments.

FIG. 7 is a flow diagram of method steps for constructing a light assembly 180 that can be implemented in the vehicle lighting system of FIG. 1, according to various embodiments. Although the method steps are described in conjunction with the systems of FIGS. 1-6, persons skilled in the art will understand that the method steps can be performed in any order by any system.

The method 700 begins by forming (at step 710) a PCB layer 300 to have a geometric shape that is based on a geometric shape of a corresponding vehicle component 200. In some embodiments, the PCB layer 300 is constructed to have a geometric shape that approximates, resembles, and/or is substantially similar to a geometric shape of the corresponding vehicle component 200. The method 700 also includes mounting (at step 720) a set of one or more light sources 310 (such as LEDs) onto the PCB layer 300 and forming a set of terminals 320 on the PCB layer 300. Internal wiring/traces are also formed on the PCB layer 300 to connect the set of terminals 320 to the set of light sources 310 for supplying power and control signals to the set of light sources 310. The formed PCB layer 300 with the mounted light sources 310, terminals 320, and internal wiring/traces may be referred to as a PCB Assembly (PCBA).

The method 700 further includes forming (at 730) a protective layer 620 over the PCB layer 300 (such as a hard plastic cover) and forming a fabric layer 510 over the protective layer 620. The method 700 further includes attaching (at step 740) external wiring 330 to the terminals 320 on the PCB layer 300. The external wiring 330 is connected to a corresponding light controller 170 for supplying power and control signals to the set of light sources 310 for generating desired lighting effects. The method 700 further includes attaching/fixing (at step 750) the formed PCB layer 300 to a corresponding vehicle component 200, for example, via an adhesive layer 610. The method 700 then ends.

Techniques for Controlling the Light Assembly

Figure 8:
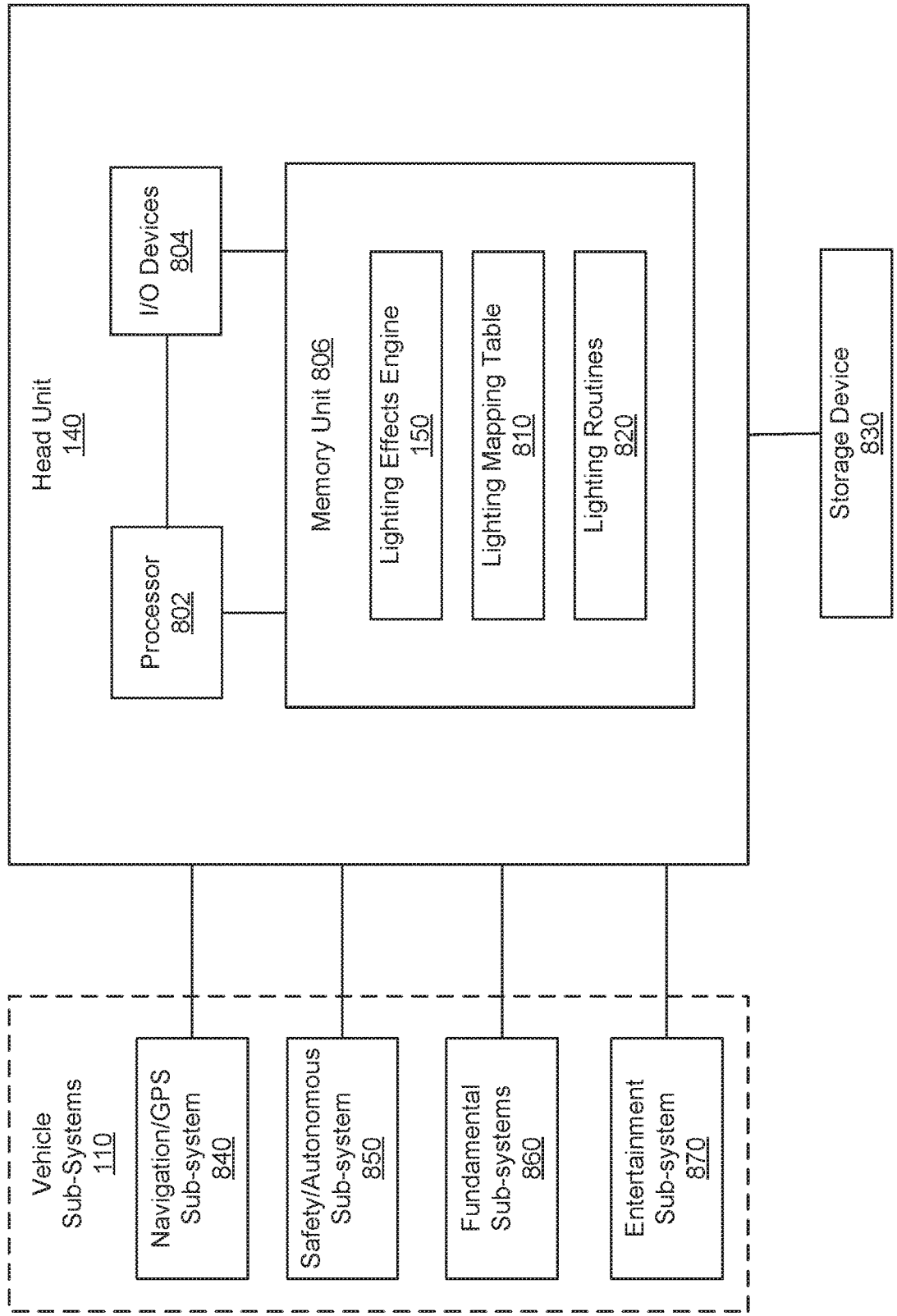
FIG. 8 illustrates an exemplary head unit that can be implemented in the vehicle lighting system of FIG. 1, according to various embodiments.

As discussed above in relation to FIG. 1, the vehicle lighting system 100 includes vehicle sub-systems 110 and a head unit 140 that executes a lighting effects engine 150. Based on received inputs, the lighting effects engine 150 provides lighting effects to the interior of the vehicle via the set of one or more light controllers 170 (such as 170a-170n) and the set of light assemblies 180 (such as 180a-180n). FIG. 8 illustrates an exemplary head unit 140 that can be implemented in the vehicle lighting system of FIG. 1, according to various embodiments. As shown, the head unit 140 comprises at least one processor 802, input/output (I/O) devices 804, and a memory unit 806, coupled together.

In general, a processor 802 may be any technically feasible processing device or hardware unit capable of processing data and executing software applications and program code. The processor 802 of the head unit 140 allows on-board processing of instructions, commands, and lighting routines, particularly as part of an application layer and/or API of the head unit 140. The processor 802 executes the software and performs the functions and operations set forth in the embodiments described herein. For example, a processor 802 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU, or many CPUs configured to work together through cloud computing.

The memory unit 806 may include a hard disk, a random access memory (RANI) module, a flash memory unit, or any other type of memory unit or combination thereof. Processor and I/O devices read data from and write data to memory 806. The memory unit 806 is configured to store software application(s) and data. Instructions from the software constructs within the memory unit 806 are executed by processors to enable the operations and functions described herein. In various embodiments, the memory unit 806 is configured to store a lighting effects engine 150, lighting mapping table 810, and lighting routines 820 for performing embodiments herein. The head unit 140 may be connected to a storage device 830 comprising a persistent storage device, such as a hard disk drive (HDD) or flash memory. The storage device 830 stores, for example, the lighting effects engine 150, lighting mapping table 810, and lighting routines 820.

The processor 802 is configured to execute the lighting effects engine 150 to provide an underlying functionality of a vehicle lighting system as described in various embodiments herein. In other embodiments, the lighting effects engine 150 is executed within a stand-alone lighting effects unit that is connected with the head unit 140. In these embodiments, the lighting effects unit comprises a memory unit and processor for executing the lighting effects engine 150 to provide an underlying functionality of a vehicle lighting system as described in various embodiments herein. The lighting effects engine 150 may comprise an add-on feature, part of the original equipment manufacturer (OEM) controls of the vehicle, or a combination of both.

The I/O devices 804 are also coupled to memory 806 and comprise as a front end interface located in the vehicle that allows the user to interact with the head unit 140 and vehicle sub-systems 110 via user inputs, such as voice commands and touch inputs. The I/O devices 804 include devices capable of receiving user inputs, such as a microphone (for receiving voice commands), a keyboard, a mouse, a control stick, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth.

The head unit 140 is coupled to one or more vehicle sub-systems 110, such as a navigation/GPS sub-system 840, safety/autonomous sub-system 850, fundamental sub-systems 860, and entertainment sub-system 870. In some embodiments, the lighting effects engine 150 receives inputs from a user (via the I/O devices 804 of the head unit 140) and/or one or more vehicle sub-systems 110, and outputs a lighting effect corresponding to the received input. In particular, the lighting effects engine 150 maps a received input to a particular lighting effect via the lighting mapping table 810 and retrieves a set of lighting routines associated with the lighting effect. The lighting effects engine 150 then outputs/transmits the set of lighting routines to the set of light controllers 170, which in turn, apply/execute the set of lighting routines on the set of light assemblies 180 to collectively produce the desired lighting effect.

A lighting routine 820 comprises a set of instructions, set of commands, data signals, and/or control signals. A lighting effect comprises a dynamic lighting effect or a static lighting effect. For a dynamic lighting effect, a corresponding lighting routine 820 specifies an ordered sequence of activated light sources 310 on a light assembly 180 to generate the dynamic lighting effect. The lighting routine 820 for a dynamic lighting effect may further specify the colors, brightness, and timing of the activated light sources 310. For a static lighting effect, a corresponding lighting routine 820 specifies activation of particular light sources 310 on a light assembly 180 to generate the static lighting effect. The lighting routine 820 for a static lighting effect may further specify the colors and brightness of the activated light sources 310.

Each lighting routine 820 in the set of lighting routines is associated with a particular light controller 170 and light assembly 180 pair. The lighting routines 820 in the set of lighting routines may differ from one another depending on the lighting effect to be achieved. For example, to achieve a first lighting effect, a first lighting routine transmitted to a first light controller 170 may be different than a second lighting routine transmitted to a second light controller 170. The set of light controllers 170 collectively generate the desired lighting effect by executing the received lighting routines on the set of light assemblies 180. Each light controller 170 applies/executes the received lighting routine 820 on the corresponding light assembly 180 by controlling the light sources 310 of the light assembly 180 in accordance with the received lighting routine. In particular, each light controller 170 controls the light sources 310 of the light assembly 180 by sending control signals to the light sources 310 for controlling the light sources 310 in accordance with the received lighting routine.

In some embodiments, the communications/interactions between the vehicle sub-systems 110, the lighting effects engine 150, and the set of light controllers 170 are implemented via Controller Area Network (CAN), and/or LIN Local Interconnect Network (LIN), MOST (Media Oriented Systems Transport), IEEE 1394, or other suitable technologies. In other embodiments, the communications/interactions between the vehicle sub-systems 110, the lighting effects engine 150, and the set of light controllers 170 are implemented via other protocols and/or bus standards configured to allow vehicle components to communicate with each other.

In some embodiments, the lighting effects engine 150 receives inputs from a user/occupant via the I/O devices 804 of the head unit 140. For example, the user inputs may select turning on or turning off the lighting effects function of the vehicle lighting system 100, or select a particular lighting effect. The lighting effects engine 150 then maps the user input to a corresponding lighting effect. For example, the user may select a "starry night" lighting effect which illuminates the vehicle interior with points of white light, simulating a night sky with stars. In response, the lighting effects engine 150 maps the "starry night" lighting effect to a corresponding set of lighting routines, and transmits the set of lighting routines to the set of light controllers 170 for generating the "starry night" lighting effect. Examples of other user-selectable lighting effects include a "tranquil" light effect that illuminates the vehicle interior with a light-blue light, and a "red-flash" light effect that illuminates the vehicle interior with a flashing red light. In other embodiments, the user-selectable lighting effects include other lighting effects.

In some embodiments, the lighting effects engine 150 receives input signals from one or more vehicle sub-systems 110, and outputs a lighting effect corresponding to the received input signals. The input signals received from the vehicle sub-systems 110 may comprise data signals, control signals, and/or audio signals. The one or more vehicle sub-systems 110 may include a navigation/GPS sub-system 840, a safety/autonomous sub-system 850, fundamental sub-systems 860, and an entertainment sub-system 870. In other embodiments, the one or more vehicle sub-systems 110 include other vehicle sub-systems.

The lighting effects engine 150 may receive input signals from the navigation/GPS sub-system 840 that specify navigation information (such as navigation directions). For example, the input signals may specify a "turn left" navigation direction. The lighting effects engine 150 may then map the input signal to a "turn left" lighting effect that includes activating blue blinking lights at a light assembly 180 located at the left-front position within the vehicle. The lighting effects engine 150 retrieves a set of lighting routines corresponding to the "turn left" lighting effect and transmits the set of lighting routines to the set of light controllers 170 for generating the "turn left" lighting effect. In this example, a first light assembly 180a is located at the left-front speaker cover, and therefore a lighting routine is sent to the corresponding first light controller 170a that causes the first light assembly 180a to generate blue blinking lights. In this example, the remaining light controllers 170 may receive no lighting routine, or a lighting routine that specifies activation/illumination of none of the light sources.

The lighting effects engine 150 may receive input signals from the safety/autonomous sub-system 850, which provides safety and self-drive (autonomous) functions for the vehicle. For example, the input signals may specify that another vehicle is detected in the right blind-spot. The lighting effects engine 150 then maps the input signal to a "right blind-spot" lighting effect that includes activating red flashing lights at a light assembly 180 located at the right-front position within the vehicle. The lighting effects engine 150 retrieves a set of lighting routines corresponding to the "right blind-spot" lighting effect and transmits the set of lighting routines to the set of light controllers 170 for generating the "right blind-spot" lighting effect. In this example, a second light assembly 180b is located at the right-front speaker cover, and therefore a lighting routine is sent to the corresponding second light controller 170b that causes the second light assembly 180b to generate red flashing lights. In this example, the remaining light controllers 170 may receive no lighting routine, or a lighting routine that specifies activation/illumination of none of the light sources.

The lighting effects engine 150 may receive input signals from the fundamental sub-systems 860 of the vehicle, which provides fundamental/basic functions for the vehicle such as braking, acceleration, turn signals, and the like. For example, the fundamental sub-systems 860 includes vehicle components such as an engine control unit (ECU) to control engine parameters or monitor the vehicle's engine, a powertrain control module (PCM), and a series of sensor systems (such as tire pressure monitoring system, a temperature sensor, and the like), among other vehicle components. For example, the input signals may specify that braking of the vehicle is detected. The lighting effects engine 150 then maps the input signal to a "braking" lighting effect that includes activating steady red lights at a light assembly 180 located at the front dashboard within the vehicle. The lighting effects engine 150 retrieves a set of lighting routines corresponding to the "braking" lighting effect and transmits the set of lighting routines to the set of light controllers 170 for generating the "braking" lighting effect. In this example, a third light assembly 180c is located at the front dashboard, and therefore a lighting routine is sent to the corresponding third light controller 170c that causes the third light assembly 180c to illuminate steady red lights. In this example, the remaining light controllers 170 may receive no lighting routine, or a lighting routine that specifies activation/illumination of none of the light sources.

The lighting effects engine 150 may receive input signals from the entertainment sub-system 870, which provides audio/video functions that provide, for example, audio and/or video output to a set of audio speakers and/or a video display (not shown). The entertainment sub-system 870 include entertainment components comprising speaker amplifiers, components controlling a volume of the amplifiers, an analog or digital radio, CD/DVD player, or other media sources/players. For example, the input signals may specify that the volume of the amplifier is being increased. The lighting effects engine 150 then maps the input signal to a "volume increase" lighting effect that includes illuminating green lights in sequence from left to right at a light assembly 180 located at the front dashboard within the vehicle. The lighting effects engine 150 retrieves a set of lighting routines corresponding to the "volume increase" lighting effect and transmits the set of lighting routines to the set of light controllers 170 for generating the "volume increase" lighting effect. In this example, a third light assembly 180c is located at the front dashboard, and therefore a lighting routine is sent to the corresponding third light controller 170c that causes the third light assembly 180c to illuminate green lights in sequence from left to right. In this example, the remaining light controllers 170 may receive no lighting routine, or a lighting routine that specifies activation/illumination of none of the light sources. In other embodiments, the lighting effects engine 150 receives audio signals from the entertainment sub-system 870 and provides lighting effects based on the audio signals, such as the frequencies or volume of the audio signals.

FIG. 9 is a conceptual diagram of the lighting mapping table 810 of FIG. 8, according to various embodiments. For each received input (e.g., from the user or a vehicle sub-system 110), the lighting effects engine 150 determines a corresponding lighting effect via the lighting mapping table 810. As shown, the lighting mapping table 810 comprises a plurality of sections 950 (such as 950a, 950b, 950c, etc.), each section 950 comprises a plurality of mapping entries 901 (such as 901a, 901b, 901c, etc.).

Each section 950 corresponds to a particular source or type of input received by the lighting effects engine 150. For example, a first section 950a includes mapping entries 901 for various inputs received from a user/occupant via the I/O devices 804 (represented as "UI" inputs in FIG. 9), a second section 950b includes mapping entries 901 for various inputs received from the navigation/GPS sub-system 840 (represented as "Navi" inputs in FIG. 9), a third section 950c includes mapping entries 901 for various inputs received from the safety/autonomous sub-system 850 (represented as "SA" inputs in FIG. 9), a fourth section 950d includes mapping entries 901 for various inputs received from the fundamental sub-systems 860 (represented as "Fund" inputs in FIG. 9), and a fifth section 950e includes mapping entries 901 for various inputs received from the entertainment sub-system 870 (represented as "ENT" inputs in FIG. 9).

Each mapping entry 901 comprises a mapping from a particular input 910 to a particular lighting effect 920 corresponding to the input 910. Each input 910 is identified by a unique identifier and each lighting effect 920 is also identified by a unique identifier. Each mapping entry 901 may further specify the lighting effect 920 by specifying a set of lighting routines associated with the lighting effect 920. Each lighting routine in the set of lighting routines is identified by a unique identifier (such as "LR_1," "LR_2," "LR_3," etc.). Each lighting routine in the set of lighting routines may be retrieved from the storage device 830 using the unique identifier of the lighting routine. The mapping entry 901 may specify the set of lighting routines in a predetermined sequence/order to indicate the light controller 170 and light assembly 180 pair that is associated with each lighting routine in the set of lighting routines.

Thus, each mapping entry 901 may specify the set of lighting routines as a sequence of lighting routines. For example, a first lighting routine in the sequence may be associated with a first light assembly 180a located at the left-front speaker cover, a second lighting routine in the sequence may be associated with a second light assembly 180b located at the right-front speaker cover, a third lighting routine in the sequence may be associated with a third light assembly 180c located at the front dashboard, a fourth lighting routine in the sequence may be associated with a fourth light assembly 180d located at the left-rear speaker cover, and a fifth lighting routine in the sequence may be associated with a fifth light assembly 180e located at the right-rear speaker cover. For example, a mapping entry 901 specifying a sequence of lighting routines as "LR_3; LR_3; LR_8; LR_2; LR_2" indicates a first lighting routine LR_3 that is associated with a first light controller 170a and first light assembly 180a pair, a second lighting routine LR_3 that is associated with a second light controller 170b and second light assembly 180b pair, a third lighting routine LR_8 that is associated with a third light controller 170c and third light assembly 180c pair, a fourth lighting routine LR_2 that is associated with a fourth light controller 170d and fourth light assembly 180d pair, and a fifth lighting routine LR_2 that is associated with a fifth light controller 170e and fifth light assembly 180e pair.

The first section 950a of the mapping table 810 includes mapping entries 901 for inputs received from a user/occupant (represented as "UI" inputs in FIG. 9). An example of a mapping entry 901 in the first section 950a includes a user input selecting the "starry night" lighting effect that maps to the "starry night" lighting effect specified by a same lighting routine (e.g., LR_11) that is sent to each light controller 170 in the set of light controllers 170. For example, the sequence of lighting routines may comprise LR_11; LR_11; LR_11; LR_11; LR_11. Another example of a mapping entry 901 in the first section 950a includes a user input selecting the turning off of the lighting effects that maps to the "off" lighting effect specified by a same lighting routine (e.g., LR_0) that is sent to each light controller 170 in the set of light controllers 170. For example, the sequence of lighting routines may comprise LR_0; LR_0; LR_0; LR_0; LR_0. In this example, the lighting routine (e.g., LR_0) specifies activation/illumination of none of the light sources of the light assembly 180. In other embodiments, the first section 950a of the mapping table 810 includes other types of mapping entries 901.

The second section 950b includes mapping entries 901 for inputs received from the navigation/GPS sub-system 840 (represented as "Navi" inputs in FIG. 9). An example of a mapping entry 901 in the second section 950b includes an input comprising a "turn left" navigation direction that maps to the "turn left" lighting effect specified by a lighting routine (e.g., LR_3) that is sent only to the light controller 170 corresponding to the light assembly 180 located at the left-front speaker cover. For example, the sequence of lighting routines may comprise LR_3; LR_0; LR_0; LR_0; LR_0. Another example of a mapping entry 901 in the second section 950b includes an input comprising a "turn right" navigation direction that maps to the "turn right" lighting effect specified by a lighting routine (e.g., LR_3) that is sent only to the light controller 170 corresponding to the light assembly 180 located at the right-front speaker cover. For example, the sequence of lighting routines may comprise LR_0; LR_3; LR_0; LR_0; LR_0.

The third section 950c includes mapping entries 901 for inputs received from the safety/autonomous sub-system 850 (represented as "SA" inputs in FIG. 9). An example of a mapping entry 901 in the third section 950c includes an input comprising detection of another vehicle in the left blind-spot that maps to the "left blind-spot" lighting effect specified by a lighting routine (e.g., LR_8) that is sent only to the light controller 170 corresponding to the light assembly 180 located at the left-front speaker cover. For example, the sequence of lighting routines may comprise LR_8; LR_0; LR_0; LR_0; LR_0. Another example of a mapping entry 901 in the third section 950c includes an input comprising a detection of another vehicle in the right blind-spot that maps to the "right blind-spot" lighting effect specified by a lighting routine (e.g., LR_8) that is sent only to the light controller 170 corresponding to the light assembly 180 located at the right-front speaker cover. For example, the sequence of lighting routines may comprise LR_0; LR_8; LR_0; LR_0; LR_0. Another example of a mapping entry 901 in the third section 950c includes an input comprising a detection of another vehicle in front that maps to the "front vehicle" lighting effect specified by a lighting routine (e.g., LR_8) that is sent only to the light controllers 170 corresponding to the light assemblies 180 located at the left-front speaker cover, right-front speaker cover, and front dash. For example, the sequence of lighting routines may comprise LR_8; LR_8; LR_8; LR_0; LR_0.

The fourth section 950d includes mapping entries 901 for inputs received from the fundamental sub-systems 860 (represented as "Fund" inputs in FIG. 9). An example of a mapping entry 901 in the fourth section 950*d* includes an input comprising detection of a left turn signal that maps to the "left turn signal" lighting effect specified by a lighting routine (e.g., LR_13) that is sent only to the light controller 170 corresponding to the light assembly 180 located at the left-front speaker cover. For example, the sequence of lighting routines may comprise LR_13; LR_0; LR_0; LR_0; LR_0. Another example of a mapping entry 901 in the fourth section 950*d* includes an input comprising detection of a right turn signal that maps to the "right turn signal" lighting effect specified by a lighting routine (e.g., LR_13) that is sent only to the light controller 170 corresponding to the light assembly 180 located at the right-front speaker cover. For example, the sequence of lighting routines may comprise LR_0; LR_13; LR_0; LR_0; LR_0. Another example of a mapping entry 901 in the fourth section 950*d* includes an input comprising detection of braking of the vehicle that maps to the "braking" lighting effect specified by a lighting routine (e.g., LR_12) that is sent only to the light controllers 170 corresponding to the light assemblies 180 located at the left-front speaker cover, right-front speaker cover, and front dash. For example, the sequence of lighting routines may comprise LR_12; LR_12; LR_12; LR_0; LR_0.

The fifth section 950*e* includes mapping entries 901 for inputs received from the entertainment sub-system 870 (represented as "ENT" inputs in FIG. 9). An example of a mapping entry 901 in the fifth section 950*e* includes an input comprising increasing of the amplifier volume that maps to the "volume increase" lighting effect specified by a lighting routine (e.g., LR_15) that is sent only to the light controller 170 corresponding to the light assembly 180 located at the front dashboard. For example, the sequence of lighting routines may comprise LR_0; LR_0; LR_15; LR_0; LR_0. Another example of a mapping entry 901 in the fifth section 950*e* includes an input comprising decreasing of the amplifier volume that maps to the "volume decrease" lighting effect specified by a lighting routine (e.g., LR_16) that is sent only to the light controller 170 corresponding to the light assembly 180 located at the front dashboard. For example, the sequence of lighting routines may comprise LR_0; LR_0; LR_16; LR_0; LR_0. For example, the lighting routine (e.g., LR_16) causes the light assembly 180 to illuminate green lights in sequence from right to left. Another example of a mapping entry 901 in the fifth section 950*e* includes an input comprising increasing of the amplifier volume to maximum that maps to the "volume maximum" lighting effect specified by a lighting routine (e.g., LR_19) that is sent to all light controllers 170 in the set of light controllers 170. For example, the sequence of lighting routines may comprise LR_19; LR_19; LR_19; LR_19; LR_19. For example, the lighting routine (e.g., LR_19) causes the light assembly 180 to briefly illuminate red lights.

Figure 10:
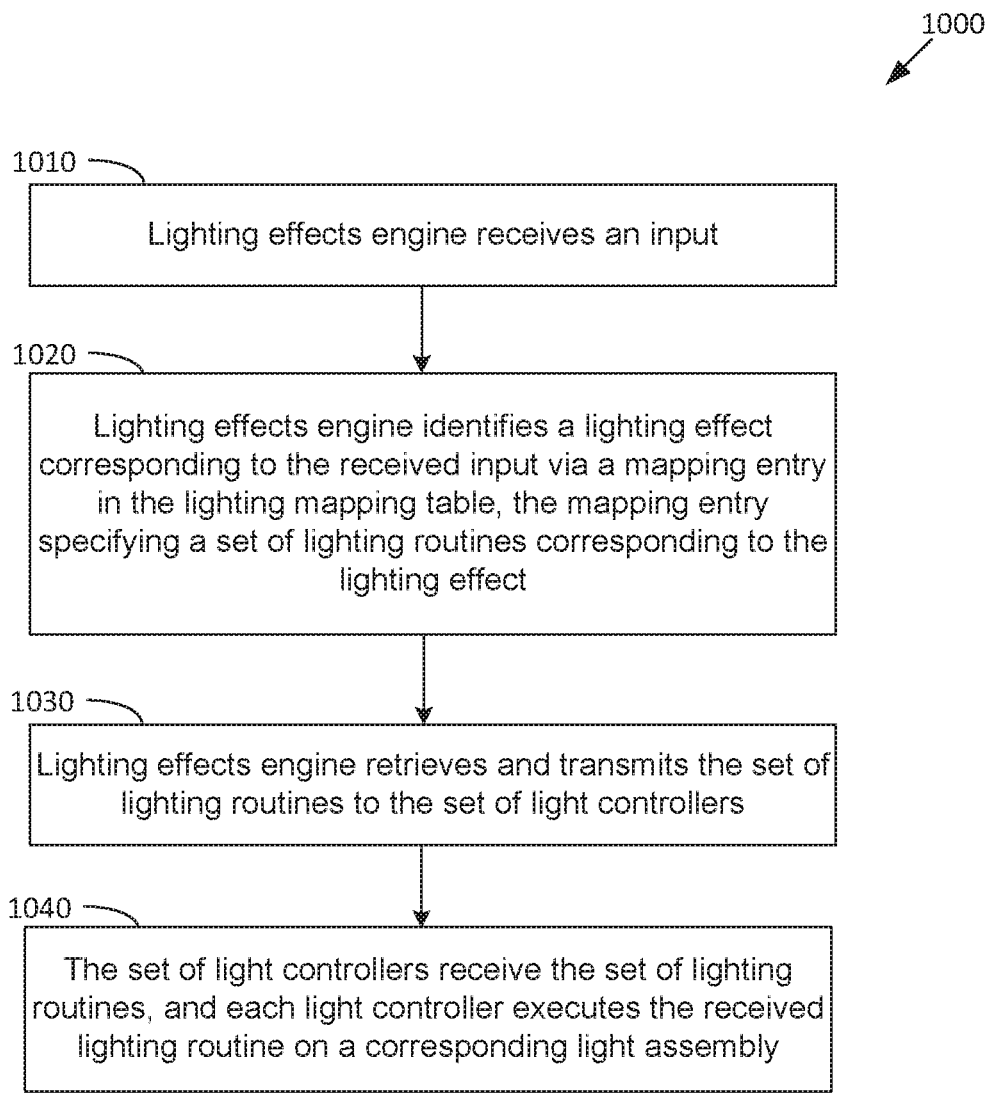
FIG. 10 is a flow diagram of method steps for controlling a set of light assemblies that can be implemented in the vehicle lighting system of FIG. 1, according to various embodiments.

FIG. 10 is a flow diagram of method steps for controlling a set of light assemblies 180 that can be implemented in the vehicle lighting system of FIG. 1, according to various embodiments. Although the method steps are described in conjunction with the systems of FIGS. 1-6 and 8-9, persons skilled in the art will understand that the method steps can be performed in any order by any system. In some embodiments, the method 1000 may be performed by the lighting effects engine 150 in conjunction with the vehicle sub-systems 110, the set of light controllers 170, and the set of light assemblies 180.

The method 1000 begins by receiving (at step 1010) an input at the lighting effects engine 150. For example, the received input may comprise a user input received via the I/O devices 804, or an input signal received from a vehicle sub-system 110, such as the navigation/GPS sub-system 840, safety/autonomous sub-system 850, fundamental sub-systems 860, or entertainment sub-system 870. The lighting effects engine 150 identifies (at step 1020) a lighting effect corresponding to the received input, for example, via a lighting mapping table 810. The lighting effects engine 150 determines a mapping entry 901 in the lighting mapping table 810 that is associated with the received input, the mapping entry 901 specifying a set of lighting routines corresponding to the identified lighting effect. The mapping entry 901 further specifies a particular light controller 170 and light assembly 180 pair associated with each lighting routine 820 in the set of lighting routines.

The lighting effects engine 150 retrieves (at step 1030) the set of lighting routines from a storage device 830 and transmits the set of lighting routines to the set of light controllers 170 for execution. Each lighting routine 820 in the set of lighting routines is transmitted to the particular light controller 170 associated with the lighting routine 820. The set of light controllers 170 receive (at step 1040) the set of lighting routines, and each light controller 170 applies/executes the received lighting routine 820 on the corresponding light assembly 180 by controlling the light sources 310 of the light assembly 180 in accordance with the received lighting routine. In particular, each light controller 170 controls the light sources 310 of the light assembly 180 by sending control signals to the light sources 310 for controlling the light sources 310 in accordance with the received lighting routine. The method 1000 then continues at step 1010 whereby the lighting effects engine 150 receives a next input.

In sum, a system and method is disclosed for constructing and controlling one or more light assemblies in an interior of a vehicle. In some embodiments, a light assembly is constructed by forming a PCB layer to have a geometric shape that is based on a geometric shape of a corresponding vehicle component. A set of light sources (such as LEDs) are mounted onto the PCB layer, and terminals and internal wiring are formed on the PCB layer. A protective layer is formed over the PCB layer and a fabric layer is formed over the protective layer. External wiring is attached to the terminals, the external wiring 330 being connected to a corresponding light controller for supplying power and control signals to the set of light sources. The formed PCB layer 300 is attached to the corresponding vehicle component, for example, via an adhesive layer. In some embodiments, a lighting effects engine receives an input from a user or a vehicle sub-system, determines a lighting effect corresponding to the received input, retrieves a set of lighting routines associated with the lighting effect, and transmits the set of lighting routines to the set of light controllers. The set of light controllers collectively generate the lighting effect by applying/executing the received lighting routines on the set of light assemblies.

At least one technical advantage of the disclosed techniques relative to the prior art is that the disclosed techniques enable varying lighting effects within the interior of a vehicle via a simple and robust light assembly. In that regard, the light assembly is constructed by forming a printed circuit board (PCB) layer in the shape of a vehicle component, mounting light sources on the PCB layer, and attaching the PCB layer with the mounted light sources onto the vehicle component. The light assembly is connected to a light controller that controls the mounted light sources. The light controller receives lighting routines from a lighting effects engine and controls the light sources of the light assembly to generate the desired lighting effects. In this manner, lighting effects within the interior of a vehicle are provided via a relatively simple, compact, and robust light assembly. These technical advantages represent one or more technological advancements over prior art approaches.

Aspects of the subject matter described herein are set out in the following numbered clauses.

1. In some embodiments, a vehicle lighting system, comprising: a light assembly having: a printed circuit board (PCB) layer that is attachable to a vehicle component, wherein a shape of the PCB layer is based on a shape of the vehicle component; and a set of light sources mounted on the PCB layer; and a light controller that is coupled to the light assembly and, when in operation, causes the set of light sources to generate a lighting effect within an interior of a vehicle.

2. The vehicle lighting system of clause 1, the light assembly further having an adhesive layer for attaching the PCB layer to the vehicle component.

3. The vehicle lighting system of any of clauses 1-2, the light assembly further having a fabric layer formed over the PCB layer.

4. The vehicle lighting system of any of clauses 1-3, the light assembly further having: a protective layer formed over the PCB layer; and a fabric layer formed over the PCB layer.

5. The vehicle lighting system of any of clauses 1-4, wherein the set of light sources comprises a set of light-emitting diodes (LEDs).

6. The vehicle lighting system of any of clauses 1-5, further comprising: a lighting effects engine coupled to the light controller, wherein the lighting effects engine, in operation, transmits a first lighting routine to the light controller, wherein the light controller causes the set of light sources to generate a lighting effect based on the first lighting routine.

7. The vehicle lighting system of any of clauses 1-6, wherein the lighting effects engine, in operation, receives user input from a head unit of the vehicle, and determines the first lighting routine based on the user input.

8. The vehicle lighting system of any of clauses 1-7, wherein the lighting effects engine is further coupled to at least one vehicle sub-system and, in operation, receives an input signal from the at least one vehicle sub-system, and determines the first lighting routine based on the input signal.

9. The vehicle lighting system of any of clauses 1-8, wherein, when determining the first lighting routine, the lighting effects engine: identifies a lighting effect corresponding to the input signal based on a lighting mapping table; determines a plurality of lighting routines that correspond to the lighting effect and are associated with a plurality of different lighting assemblies installed within the interior of the vehicle, wherein the first lighting routine is included in the plurality of lighting routines; and determines that the first lighting routine is associated with the lighting assembly.

10. The vehicle lighting system of any of clauses 1-9, wherein the at least one vehicle sub-system comprises at least one of navigation sub-system, a safety sub-system, a fundamental sub-system, or an entertainment sub-system.

11. In some embodiments, a computer-implemented method comprising: transmitting, at a lighting effects engine, a first lighting routine to a light controller coupled to a light assembly having a printed circuit board (PCB) layer and a set of light sources mounted on the PCB layer; and controlling, at the light controller, the set of light sources to generate a lighting effect within an interior of a vehicle based on the first lighting routine.

12. The computer-implemented method of clause 11, the PCB layer being attachable to a vehicle component, wherein a shape of the PCB layer is based on a shape of the vehicle component.

13. The computer-implemented method of any of clauses 11-12, the light assembly further having an adhesive layer for attaching the PCB layer to the vehicle component.

14. The computer-implemented method of any of clauses 11-13, the light assembly further having a fabric layer formed over the PCB layer.

15. The computer-implemented method of any of clauses 11-14, wherein the set of light sources comprises a set of light-emitting diodes (LEDs).

16. The computer-implemented method of any of clauses 11-15, further comprising: receiving a user input from a head unit of the vehicle; and determining the first lighting routine based on the user input.

17. The computer-implemented method of any of clauses 11-16, wherein determining the first lighting routine comprises: identifying the lighting effect corresponding to the user input based on a lighting mapping table; determining a plurality of lighting routines that correspond to the lighting effect and are associated with a plurality of different lighting assemblies installed within the interior of the vehicle, wherein the first lighting routine is included in the plurality of lighting routines; and determining that the first lighting routine is associated with the lighting assembly.

18. The computer-implemented method of any of clauses 11-17, further comprising: receiving an input signal from a vehicle sub-system; and determining the first lighting routine based on the input signal.

19. The computer-implemented method of any of clauses 11-18, the PCB layer being attachable to a vehicle component, wherein the vehicle component comprises at least one of a speaker cover, a mirrorsail, a door panel, a dashboard panel, a ceiling panel, or a pillar panel.

20. In some embodiments, one or more non-transitory computer-readable media storing instructions that, when executed by one or more processors, cause the one or more processors to perform the steps of: transmitting, at a lighting effects engine, a first lighting routine to a light controller coupled to a light assembly having a printed circuit board (PCB) layer and a set of light sources mounted on the PCB layer; and controlling, at the light controller, the set of light sources to generate a lighting effect within an interior of a vehicle based on the first lighting routine.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A vehicle lighting system comprising:
   a light assembly having:
      a printed circuit board (PCB) layer that can be attached to a vehicle component and has a shape that conforms to a shape of the vehicle component, and wherein the PCB layer is perforated with a plurality of holes to allow sound to penetrate through the PCB layer,
      an adhesive layer that attaches the PCB layer directly to the vehicle component, and
      a set of light sources mounted on the PCB layer; and
   a light controller that is coupled to the light assembly and, in operation, causes the set of light sources to generate a lighting effect within an interior of a vehicle.

2. The vehicle lighting system of claim 1, the light assembly further having a fabric layer formed over the PCB layer.

3. The vehicle lighting system of claim 1, the light assembly further having:
   a protective layer formed over the PCB layer; and
   a fabric layer formed over the PCB layer.

4. The vehicle lighting system of claim 1, wherein the set of light sources comprises a set of light-emitting diodes (LEDs).

5. The vehicle lighting system of claim 1, further comprising:
   a lighting effects engine coupled to the light controller, wherein the lighting effects engine, in operation, transmits a first lighting routine to the light controller, wherein the light controller causes the set of light sources to generate a lighting effect based on the first lighting routine.

6. The vehicle lighting system of claim 5, wherein the lighting effects engine, in operation, receives user input from a head unit of the vehicle, and determines the first lighting routine based on the user input.

7. The vehicle lighting system of claim 5, wherein the lighting effects engine is further coupled to at least one vehicle sub-system and, in operation, receives an input signal from the at least one vehicle sub-system, and determines the first lighting routine based on the input signal.

8. The vehicle lighting system of claim 7, wherein, when determining the first lighting routine, the lighting effects engine:
   identifies a lighting effect corresponding to the input signal based on a lighting mapping table;
   determines a plurality of lighting routines that correspond to the lighting effect and are associated with a plurality of different lighting assemblies installed within the interior of the vehicle, wherein the first lighting routine is included in the plurality of lighting routines; and
   determines that the first lighting routine is associated with the lighting assembly.

9. The vehicle lighting system of claim 7, wherein the at least one vehicle sub-system comprises at least one of navigation sub-system, a safety sub-system, a fundamental sub-system, or an entertainment sub-system.

10. The vehicle lighting system of claim 1, wherein the adhesive layer comprises at least one of a double-sided adhesive layer or a glue.

11. The vehicle lighting system of claim 1, further comprising a protective layer that includes at least one of a plastic cover or a silicone cover.

12. The vehicle lighting system of claim 1, further comprising a protective layer that is molded onto a surface of the PCB layer.

13. A computer-implemented method comprising:
transmitting, at a lighting effects engine, a first lighting routine to a light controller coupled to a light assembly having a printed circuit board (PCB) layer that can be attached to a vehicle component, an adhesive layer that attaches the PCB layer directly to the vehicle component, and a set of light sources mounted on the PCB layer, wherein the PCB layer has a shape that conforms to a shape of the vehicle component, and wherein the PCB layer is perforated with a plurality of holes to allow sound to penetrate through the PCB layer; and
controlling, at the light controller, the set of light sources to generate a lighting effect within an interior of a vehicle based on the first lighting routine.

14. The computer-implemented method of claim 13, the light assembly further having a fabric layer formed over the PCB layer.

15. The computer-implemented method of claim 13, wherein the set of light sources comprises a set of light-emitting diodes (LEDs).

16. The computer-implemented method of claim 13, further comprising:
receiving a user input from a head unit of the vehicle; and
determining the first lighting routine based on the user input.

17. The computer-implemented method of claim 16, wherein determining the first lighting routine comprises:
identifying the lighting effect corresponding to the user input based on a lighting mapping table;
determining a plurality of lighting routines that correspond to the lighting effect and are associated with a plurality of different lighting assemblies installed within the interior of the vehicle, wherein the first lighting routine is included in the plurality of lighting routines; and
determining that the first lighting routine is associated with the lighting assembly.

18. The computer-implemented method of claim 13, further comprising:
receiving an input signal from a vehicle sub-system; and
determining the first lighting routine based on the input signal.

19. The computer-implemented method of claim 13, wherein the vehicle component comprises at least one of a speaker cover, a mirrorsail, a door panel, a dashboard panel, a ceiling panel, or a pillar panel.

20. One or more non-transitory computer-readable media storing instructions that, when executed by one or more processors, cause the one or more processors to perform steps of:
transmitting, at a lighting effects engine, a first lighting routine to a light controller coupled to a light assembly having a printed circuit board (PCB) layer that can be attached to a vehicle component and has a shape that corresponds to a shape of the vehicle component and that is perforated with a plurality of holes to allow sound to penetrate through the PCB layer, an adhesive layer that attaches the PCB layer directly to a vehicle component, and a set of light sources mounted on the PCB layer; and
controlling, at the light controller, the set of light sources to generate a lighting effect within an interior of a vehicle based on the first lighting routine.

* * * * *